United States Patent [19]

Matsumoto et al.

[11] Patent Number: 5,506,778
[45] Date of Patent: Apr. 9, 1996

[54] MISFIRE DETECTION METHOD BASED ON A CHANGE IN CRANKSHAFT ROTATION

[75] Inventors: Takuya Matsumoto; Toru Hashimoto; Mitsuhiro Miyake; Yasuhisa Yoshida; Mitsuhiko Yanagisawa; Hiroyuki Nakajima; Koichi Namiki, all of Tokyo, Japan

[73] Assignee: Mitsubishi Jidosha Kogyo Kabushiki Kaisha, Tokyo, Japan

[21] Appl. No.: 157,160

[22] PCT Filed: Jun. 8, 1993

[86] PCT No.: PCT/JP93/00766

§ 371 Date: Feb. 3, 1994

§ 102(e) Date: Feb. 3, 1994

[87] PCT Pub. No.: WO93/25811

PCT Pub. Date: Dec. 23, 1993

[30] Foreign Application Priority Data

Jun. 9, 1992 [JP] Japan ................. 4-149432
Feb. 5, 1993 [JP] Japan ................. 5-018536

[51] Int. Cl.⁶ .................................................. F01L 25/00
[52] U.S. Cl. ........................................ 364/431.08
[58] Field of Search ................ 364/424.01, 431.08, 364/431.07, 431.09, 431.03, 431.01; 123/192.1, 192.2; 73/117.3, 116

[56] References Cited

U.S. PATENT DOCUMENTS

| | | | |
|---|---|---|---|
| 4,351,281 | 9/1982 | Geiger et al. | 123/425 |
| 4,428,343 | 1/1984 | Schweikert et al. | 123/425 |
| 4,509,484 | 4/1985 | Gertiser | 123/426 |
| 5,033,425 | 7/1991 | Kadomukai et al. | 123/192 R |
| 5,041,980 | 8/1991 | Maddock et al. | 364/431.03 |
| 5,056,360 | 10/1991 | Dosdall et al. | 73/116 |
| 5,095,742 | 3/1992 | James et al. | 73/116 |
| 5,186,136 | 2/1993 | Kadomukai et al. | 123/192.1 |
| 5,237,504 | 8/1993 | Holmes et al. | 364/431.08 |
| 5,307,670 | 5/1994 | Imai et al. | 73/117.3 |

FOREIGN PATENT DOCUMENTS

| | | |
|---|---|---|
| 2-49955 | 2/1990 | Japan. |
| 2-30954 | 2/1990 | Japan. |
| 3-81544 | 4/1991 | Japan. |
| 5-86957 | 4/1993 | Japan. |

*Primary Examiner*—Kevin J. Teska
*Assistant Examiner*—Stephen J. Walder, Jr.

[57] ABSTRACT

A misfire detection method is provided, which method makes it possible to accurately detect the occurrence/absence of misfire by eliminating a detection error in misfire detection. This error is caused by a vibrational increase or decrease of the rotational changing rate of a crankshaft after a misfire state occurs. A processor, which receives pulse outputs from a crank angle sensor, calculates in sequence angular accelerations $D\omega_{n-2}$, $D\omega_{n-1}$, $D\omega_n$, and $D\omega_{n+1}$ in crank angle areas which correspond to a preceding cylinder, two cylinders checked for misfire, and a succeeding cylinder, respectively. If the values $D\omega_{n-1}$ and $D\omega_n$ n significantly decrease in comparison with the values $D\omega_{n-2}$ and $D\omega_{n-1}$, respectively, then it is tentatively determined that misfire has occurred in both cylinders checked. Then If the value $D\omega_{n+1}$ significantly increases compared to the value $D\omega_n$, then the restoration to the normal combustion state is confirmed, and the occurrence of misfire in the two cylinders checked is definitely determined.

10 Claims, 11 Drawing Sheets

MISFIRE DETECTION METHOD BASED ON A CHANGE IN CRANKSHAFT ROTATION

TECHNICAL FIELD

The present invention relates to a misfire detection method based on a change in the rotation of a crankshaft, and more particularly, to a misfire detection method which makes it possible to accurately detect the occurrence/absence of misfire even when an angular acceleration of a crankshaft increases or decreases in a vibrational manner due to a misfire condition which has taken place once.

BACKGROUND ART

The exhaust gas characteristic or the like of an internal combustion engine deteriorates if a misfire condition wherein combustion in a cylinder is not properly carried out occurs due to a failure of a fuel injection system, etc., while the internal combustion engine is working. To solve the problem, as disclosed in unexamined Japanese patent publication no. H2-30954, information corresponding to a number of revolutions is calculated on the basis of a period between prescribed crank angles corresponding to each cylinder of the engine, and the engine is checked for misfire according to a change in or a changing rate of the information. This type of misfire detection method is based on the fact that, if misfire takes place in a cylinder, then a rotational speed (angular velocity) of the crankshaft decreases because of a decrease in a torque output of the internal combustion engine; the occurrence of misfire is detected when the changing rate of the rotational speed has lowered below a discriminating reference value while the changing rate of the rotational speed (angular acceleration) of the crankshaft is repeatedly detected.

Further, according to the description of unexamined Japanese patent publication no. H2-49955, in the case of misfire detection implemented based on a difference between the rotational angular velocity of an internal combustion engine and the rotational angular velocity at the preceding ignition which serves as a reference angular speed (a discriminating reference value), i.e., a variation in rotation, which difference is calculated for every ignition interval in synchronization with a combustion stroke in the internal combustion engine, misfire cannot be accurately detected if accidental misfire takes place or if misfire takes place at a rate of about once every few rotations. To solve such a problem, in unexamined Japanese patent publication no. H2-49955, the reference angular velocity, i.e., the discriminating reference value, is updated as necessary.

However, once a misfire condition occurs in the internal combustion engine, the angular acceleration of the crankshaft occasionally increases or decreases in a vibrational manner for awhile after the misfire condition occurred, owing primarily to resonance between the internal combustion engine and a driving system connected thereto. In this case, even if no actual misfire condition has taken place, the angular acceleration of the crankshaft occasionally lowers below the discriminating reference value for misfire detection, resulting in erroneous detection being made such that a misfire condition has taken place. Thus, according to the conventional methods designed to immediately detect the occurrence of a misfire condition when a drop in the angular velocity or the like is detected in accordance with a result of comparison between the angular velocity or the angular acceleration of the crankshaft and the discriminating reference value, inaccurate detection of the occurrence/absence of misfire may happen.

DISCLOSURE OF THE INVENTION

An object of the present invention is to provide a misfire detection method which enables accurate detection of whether misfire has occurred even when the angular acceleration of a crankshaft increases or decreases in a vibrational manner because of a misfire condition having taken place once, and which does not require any special hardware for that purpose.

To accomplish the object described above, according to an aspect of the present invention, there is provided a misfire detection method based on a change in crankshaft rotation in which a parameter value representative of a crankshaft angular acceleration associated with each cylinder of an internal combustion engine is repeatedly calculated, and the occurrence/absence of misfire in a cylinder checked for misfire is detected in accordance with the calculated parameter value.

This method comprises a step of setting a first discrimination condition such that at least one of two discrimination conditions (a) and (b) is fulfilled. The discrimination condition (a) is such that the calculated parameter value associated with the cylinder checked for misfire is lower than a first judgment value. The discrimination condition (b) is such that the calculated parameter value associated with the cylinder checked for misfire has decreased by a first specified variation or more in comparison with the calculated parameter value associated with a preceding cylinder which should be ignited immediately before the ignition that is to be performed in the cylinder checked for misfire. The misfire detection method further comprises a step of setting a second discrimination condition such that at least one of two discrimination conditions (c) and (d) is fulfilled. The discrimination condition (c) is such that the calculated parameter value associated with a succeeding cylinder which should be ignited immediately after the ignition to be performed in the cylinder checked for misfire exceeds a second judgment value. The discrimination condition (d) is such that the calculated parameter value associated with the succeeding cylinder has increased by a second specified variation or more in comparison with the calculated parameter value associated with the cylinder checked for misfire. This method further comprises a step of detecting an occurrence of misfire in the cylinder checked for misfire when both the first and second discrimination conditions are fulfilled.

Preferably, it is judged that the first discrimination condition is fulfilled when both the discrimination conditions (a) and (b) are fulfilled. Furthermore, if at least one of the first and second discrimination conditions is not fulfilled, then the calculated parameter value associated with the cylinder checked for misfire is subjected to filtering. This filtering, for example, is conducted by substituting a value of 0 for the calculated parameter value.

A misfire detection method according to another aspect of the present invention comprises a step of setting a first discrimination condition such that at least one of two discrimination conditions (a) and (b) is fulfilled. The discrimination condition (a) is such that the calculated parameter value, associated with a first cylinder checked for misfire which should be ignited first out of two cylinders which are to be checked for misfire and which are to be ignited one after another, is lower than a first judgment value. The discrimination condition (b) is such that the calculated parameter value associated with a first cylinder checked for misfire has decreased by a first specified variation or more in comparison with the calculated parameter value associated with a preceding cylinder which should be ignited immediately before the ignition to be performed in the first cylinder checked for misfire. The method further comprises a step of setting a second discrimination condition (c) such that the calculated parameter value, associated with a second cylinder which is to be checked for misfire and which is to be ignited later out of the two cylinders checked for misfire, has decreased by a second specified variation or more in comparison with the calculated parameter value associated with the first cylinder checked for misfire, and a step of setting a third discrimination condition such that at least one of two discrimination conditions (d) and (e) is fulfilled. The discrimination condition (d) is such that the calculated parameter value, associated with a succeeding cylinder which should be ignited immediately after the ignition to be performed in the second cylinder checked for misfire, exceeds a second judgment value. The discrimination condition (e) is such that the calculated parameter value associated with the succeeding cylinder has increased by a third specified variation or more in comparison with the calculated parameter value associated with the second cylinder checked for misfire. This method still further comprises a step of detecting the occurrence of misfire in the first and second cylinders checked for misfire when all the first, second, and third discrimination conditions are fulfilled.

Preferably, it is judged that the first discrimination condition is fulfilled when both the discrimination conditions (a) and (b) are fulfilled.

According to still another aspect of the present invention, there is provided a misfire detection method based on a change in crankshaft rotation in which the rotational speed changing rate of the crankshaft for each cylinder of an internal combustion engine is periodically calculated, and the occurrence of misfire in a cylinder checked for misfire is detected when the rotational speed changing rate of the crankshaft in a calculating cycle corresponding to the cylinder checked for misfire has dropped below a specified discriminating reference value.

This method comprises a step of setting a first discrimination condition (a) such that a difference between the rotational speed changing rate of the crankshaft in the calculating cycle immediately after the calculating cycle corresponding to the cylinder checked for misfire and the rotational speed changing rate of the crankshaft in the calculating cycle corresponding to the cylinder checked for misfire exceeds a first threshold value, and a step of setting a second discrimination condition (b) such that a difference between the rotational speed changing rate of the crankshaft in the calculating cycle immediately before the calculating cycle corresponding to the cylinder checked for misfire and the rotational speed changing rate of the crankshaft in the calculating cycle corresponding to the cylinder checked for misfire exceeds a second threshold value. This method further comprises a step of filtering the rotational speed changing rate of the crankshaft in the calculating cycle corresponding to the cylinder checked for misfire, if at least one of the first and second discrimination conditions is not fulfilled.

Preferably, the filtering is performed by substituting the value of 0 for the rotational speed changing rate of the crankshaft which has been calculated in the calculating cycle corresponding to the cylinder checked for misfire. The rotational speed changing rate of the crankshaft is represented by the angular acceleration of the crankshaft. Preferably, the misfire detection method further comprises a step of detecting the occurrence of misfire in the cylinder checked for misfire when both the first and second discrimination conditions are fulfilled and also the rotational speed changing rate of the crankshaft in the calculating cycle corresponding to the cylinder checked for misfire is lower than a third threshold value.

As described above, according to the one-cylinder judgment type misfire detection method in accordance with one aspect of the present invention, which is designed to check a single cylinder for misfire at a time, the occurrence of misfire in the cylinder checked for misfire is detected when the calculated parameter value associated with the cylinder checked for misfire is lower than the first judgment value or has decreased by the first specified variation or more in comparison with the calculated parameter value associated with the preceding cylinder, so that the first discrimination condition is fulfilled, and at the same time, the calculated parameter value associated with the succeeding cylinder exceeds the second judgment value or has increased by the second specified variation or more in comparison with the calculated parameter for the cylinder checked for misfire, so that the second discrimination condition is fulfilled.

Typically, the first discrimination condition is fulfilled when the crankshaft angular acceleration drops due to the occurrence of misfire, while the second discrimination condition is fulfilled when a normal combustion condition has been restored from the misfire condition. Hence, according to the present invention in which the simultaneous fulfillment of both the first and second discrimination conditions are the requirement for misfire detection, the occurrence of misfire in the cylinder checked for misfire is detected only when the misfire condition has been first confirmed, then the recovery from the misfire condition to the normal combustion condition has been confirmed.

As already described, if the misfire condition takes place once, the angular acceleration of the crankshaft increases or decreases in a vibrational manner. FIG. 1 Illustrates the vibrational changes in the angular acceleration of the crankshaft caused by the occurrence of misfire when the misfire took place at the 5th, 13th, and 21st ignitions. As shown in FIG. 1, when the angular acceleration of the crankshaft changes in the vibrational manner, the first discrimination condition may be satisfied mainly due to the parameter value associated with the cylinder checked for misfire having decreased in comparison with the parameter value associated with the preceding cylinder. Or, the second discrimination condition may be satisfied mainly due to the parameter value associated with the succeeding cylinder having increased in comparison with the parameter value associated with the cylinder checked for misfire. On the other hand, even during the vibrational change in the angular acceleration of the crankshaft, it rarely happens that both the first and second discrimination conditions are satisfied unless misfire actually takes place in the cylinder checked for misfire. In other words, if a judgment as to whether both the discrimination conditions are fulfilled is made, erroneous detection is prevented and the occurrence of misfire is not overlooked even if the angular acceleration of the crankshaft vibrates due to misfire which has happened once.

Hence, according to the present invention, the occurrence/absence of misfire can be accurately detected even if the angular acceleration of the crankshaft increases or decreases in a vibrational manner because of misfire which has taken place once. In addition, the determination as to whether both the first and second discrimination conditions are simultaneously fulfilled can be made by using existing hardware, so that no special hardware is required for the misfire detection.

Furthermore, according to the 2-cylinder judgment type misfire detection method in accordance with another aspect of the present invention, which is designed to detect misfire in two cylinders at a time, the occurrence of misfire in the first and second cylinders checked for misfire is detected when the first, second and third discrimination conditions are fulfilled, the first discrimination condition being fulfilled when the calculated parameter value associated with the first cylinder checked for misfire is lower than the first judgment value, or has decreased by the first specified variation or more in comparison with the calculated parameter value associated with that cylinder which precedes the first cylinder checked for misfire, the second discrimination condition being fulfilled when the calculated parameter value associated with the second cylinder checked for misfire has decreased by the second specified variation or more in comparison with the calculated parameter value associated with the first cylinder checked for misfire, the third discrimination condition being fulfilled when the calculated parameter value associated with that cylinder which follows the second cylinder checked for misfire exceeds the second judgment value or has increased by the third specified variation or more in comparison with the calculated parameter value associated with the second cylinder checked for misfire.

When the first or second discrimination condition is fulfilled, it is very likely that misfire has taken place in the first or second one checked for misfire. Typically, the third discrimination condition is fulfilled when the normal combustion state has been restored. Therefore, according to the present invention wherein the occurrence of misfire in two cylinders checked for misfire is detected when all the first, second, and third discrimination conditions are fulfilled, whether misfire has occurred in the cylinders checked for misfire is ascertained, and whether the normal combustion state has been restored is ascertained. Further, the occurrence of misfire is conclusively determined only when the misfire condition has been ascertained and then the recovery to the normal combustion state has been ascertained. As a result, in the case of the 2-cylinder type misfire detection, it is possible to prevent erroneous detection due to the vibrational fluctuation in the angular acceleration of the crankshaft and the overlook of the occurrence of misfire.

Hence, according to the specific aspect of the present invention related to the 2-cylinder judgment, just as in the case of the aforementioned aspect related to the 1-cylinder judgment, even if the angular acceleration of the crankshaft increases or decreases in a vibrational manner due to a misfire condition having taken place, the occurrence of misfire can be accurately detected and no special hardware is required for that purpose. In addition, it is possible to detect misfire that takes place in the two cylinders in succession.

According to a misfire detection method in accordance with still another aspect of the present invention, if a difference between the rotational speed changing rate of the crankshaft in the calculating cycle immediately after the calculating cycle corresponding to the cylinder checked for misfire and the rotational speed changing rate of the crankshaft in the calculating cycle corresponding to the cylinder checked for misfire does not exceed the first threshold value, so that the first discrimination condition is not fulfilled, or if the difference between the rotational speed changing rate of the crankshaft in the calculating cycle immediately before the calculating cycle corresponding to the cylinder check for misfire and the rotational speed changing rate of the crankshaft in the calculating cycle corresponding to the cylinder check for misfire does not exceed the second threshold value, so that the second discrimination condition is not fulfilled, then the calculated changing rate in the cycle corresponding to the cylinder checked is subjected to filtering.

When the first or second discrimination condition is not fulfilled, the calculated rotational speed changing rate of the crankshaft is affected by the vibration of the rotational speed changing rate of the crankshaft after the occurrence of misfire condition. According to the present invention wherein filtering is performed in such a case, the influences exerted by the vibration on the changing rate can be eliminated. Hencem this aspect of the present invention is advantageous in that accurate detection of the occurrence/absence of misfire can be achieved without using any special hardware, just as in the case of the aspects described above.

DESCRIPTION OF THE PREFERRED EMBODIMENTS

The following describes a misfire detection method based on a change in the rotation of the crankshaft according to a first embodiment of the present invention.

Figure 1:
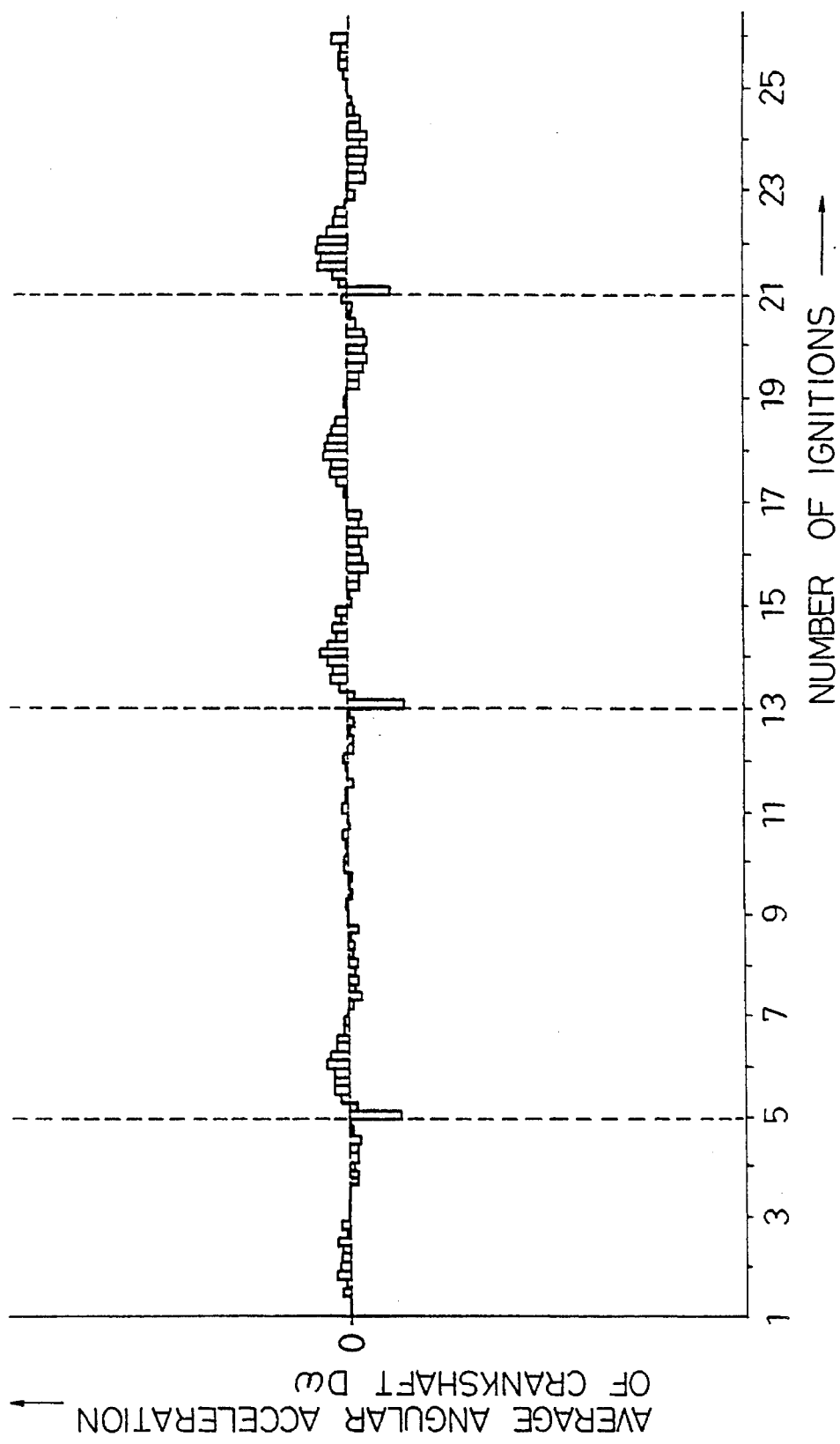
FIG. 1 is a drawing illustrating vibrational changes in the angular acceleration of a crankshaft caused by the occurrence of misfire.
Figure 2:
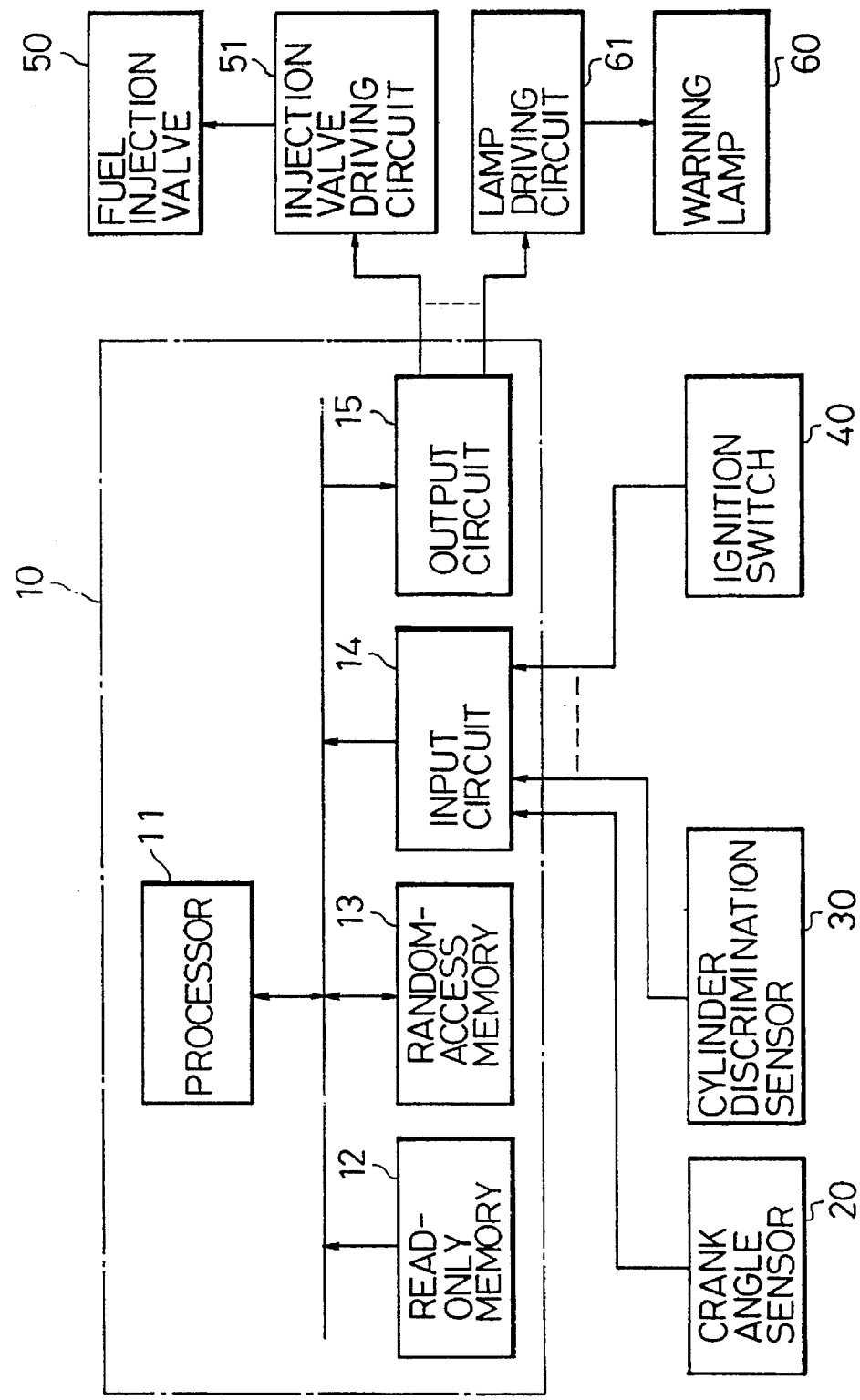
FIG. 2 is a schematic block diagram showing an apparatus for implementing a misfire detection method according to a first embodiment of the present invention.

An apparatus for implementing the misfire detection method of the present embodiment, which is mounted on, e.g., a 6-cylinder engine (not shown) as an internal combustion engine, is provided with a controller 10, a crank angle sensor 20, and a cylinder discrimination sensor 30 as major elements, as shown in FIG. 2.

Figure 3:
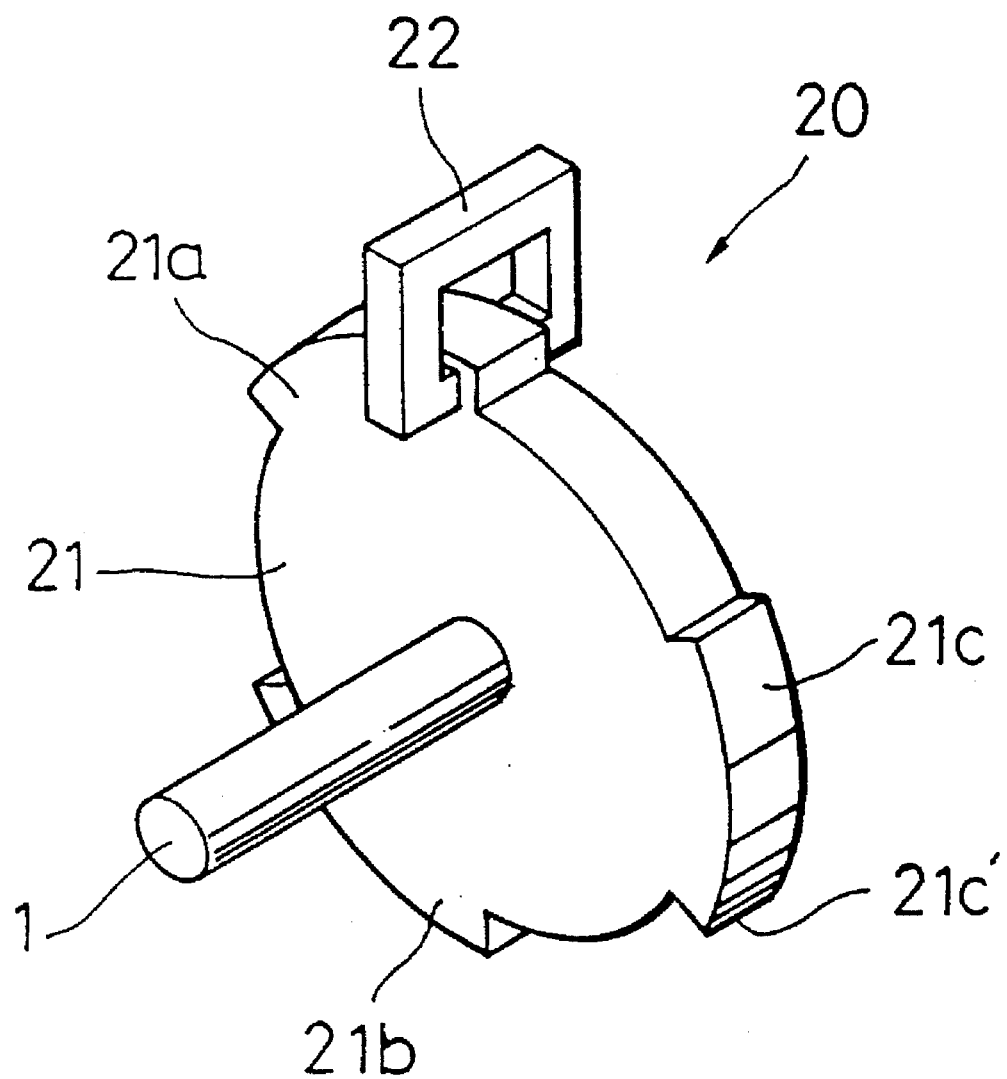
FIG. 3 is a perspective view showing a crank angle sensor of the apparatus shown in FIG. 2.

Referring to FIG. 3, a crank angle sensor 20 has a rotary member 21 disposed for rotation in unison with a crankshaft 1 of the engine, and a detector 22 disposed to face the rotary member 21 which is provided at its periphery with first, second and third vanes 21a, 21b and 21c projecting In the radial direction of the crankshaft, so that a pulse output is generated when the detector 22 optically or electromagnetically detects the passage of the vane 21a, 21b or 21c. The first through third vanes 21a, 21b, and 21c each have a circumferential length corresponding to a given crankshaft rotational angle, and are circumferentially spaced away from each other at specified angle intervals; therefore, an angle interval between corresponding ends of adjacent vanes is set to 120 degrees. Practically speaking, however, because of an error in the construction of the crank angle sensor, in particular, errors in manufacturing and installing the vanes 21a, 21b and 21c, the angle interval between the ends of adjacent vanes is not accurately 120 degrees. Generally, there is an angular interval error of about 1 degree or less.

A cylinder discrimination sensor 30 is mounted on a cam shaft, not shown, for rotation in unison therewith, and is designed so that a pulse output is generated each time the cam shaft passes a specific rotational position corresponding to one cylinder, while the crankshaft 1 rotates twice and the cam shaft rotates once.

The controller 10, which functions as a major element of the misfire detecting apparatus and carries out various regular engine control operations, has a processor 11 for executing various control programs, a read-only memory 12 storing therein the control programs, and a random-access memory 13 primarily for temporarily storing data. The processor 11 is connected, via an input circuit 14, to various sensors and switches (some of them are not shown) such as the crank angle sensor 20, the cylinder discrimination sensor 30, an ignition switch 40, an intake air amount sensor, an intake air temperature sensor, and a water temperature sensor, and is also connected, via an output circuit 15, to various driving circuits (only those corresponding to elements 50 and 60 are indicated by reference characters 51 and 61) for driving various actuators including a fuel injection valve 50 and for driving a warning lamp 60.

The apparatus of the present embodiment, which is mounted on the 6-cylinder engine wherein ignition is performed in the order of the cylinder number, is designed so that, when, for example, an end (a leading end 21c' or a trailing end) of the third vane 21c passes through the detector 22, the crankshaft enters into a first crankshaft rotational angle area corresponding to either one of the first cylinder and the fourth cylinder (preferably, corresponding primarily to an expanding stroke of the cylinder concerned), which cylinders constitute a first cylinder group, and when an end of the first vane 21a passes through the detector 22, the crankshaft leaves the first rotational angle area. Likewise, when an end of the first vane 21a passes through the detector, the crankshaft enters into a second crankshaft rotational angle area corresponding to either one of the second and fifth cylinders which constitute a second cylinder group, and when an end of the second vane 21b passes through the detector, the crankshaft leaves the area. Further, when an end of the second vane 21b passes through the detector, the crankshaft enters into a third crankshaft rotational angle area corresponding to either one of the third and sixth cylinders which constitute a third cylinder group, and when an end of the third vane 21c passes through the detector, the crankshaft leaves the area. The discrimination between the first cylinder and the fourth cylinder, the discrimination between the second cylinder and the fifth cylinder, and the discrimination between the third cylinder and the sixth cylinder are performed in accordance with outputs of the cylinder discrimination sensor 30.

The following describes the operation of the misfire detecting apparatus constructed as mentioned above.

Figure 4:
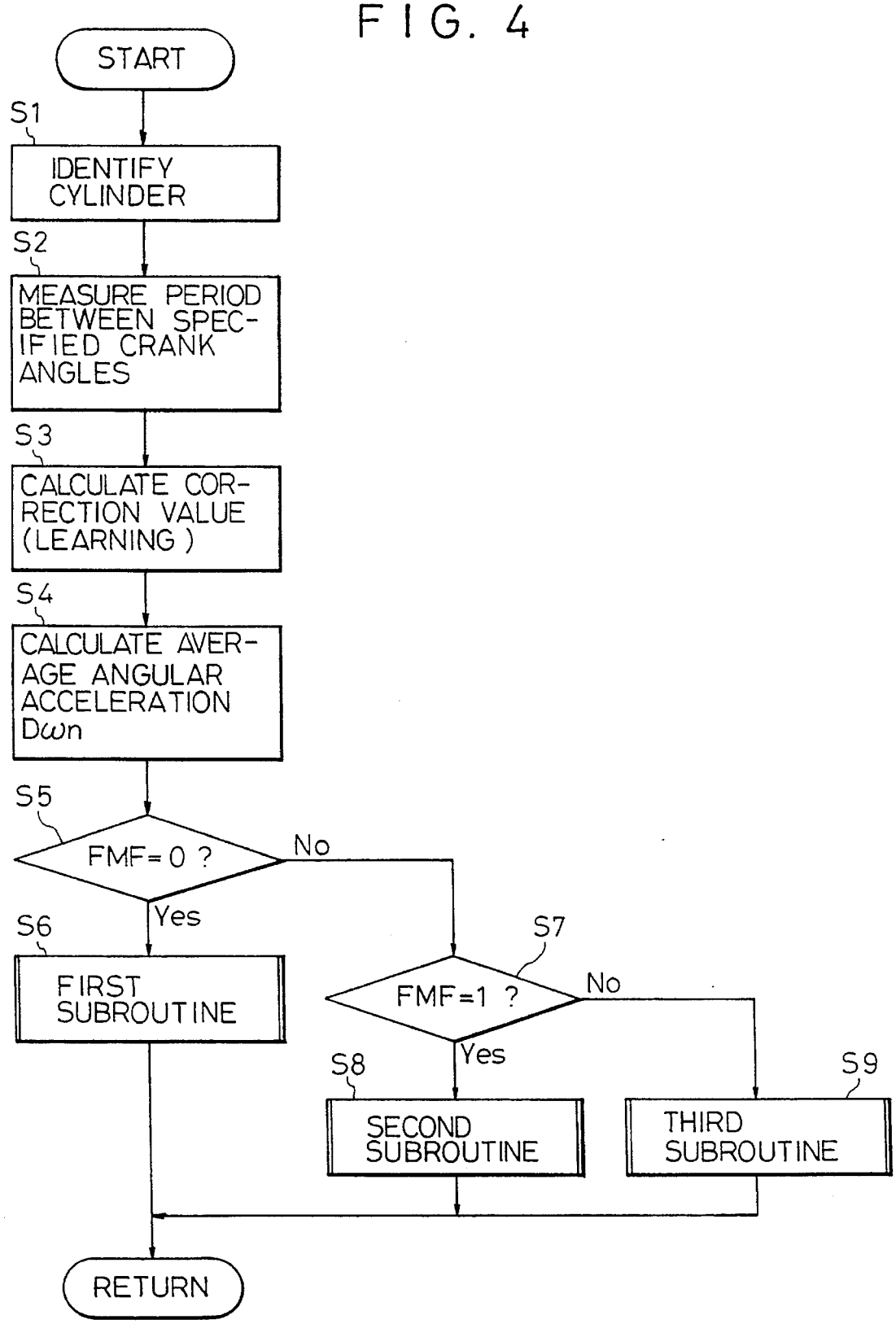
FIG. 4 is a flowchart showing misfire detection processing performed by a controller shown in FIG. 2.

While the engine is running, the processor 11 repeatedly and periodically executes the misfire detection processing shown in FIG. 4 while receiving one after another pulse outputs from the crank angle sensor 20 and pulse outputs from the cylinder discrimination sensor 30.

The processor 11 starts the misfire detection processing each time it receives a pulse output of the crank angle sensor 20.

In each detection cycle, the processor 11 first determines what number or order of crank angle sensor pulse output it has received among the crank angle sensor pulse outputs received in sequence since it received a pulse output from the cylinder discrimination sensor 30. This enables the processor to identify what number or order of cylinder is the one which corresponds to the received crank angle sensor pulse output (step S1). Preferably, a cylinder, which is implementing primarily the expanding stroke (output stroke) at the moment, is identified as that cylinder.

When the processor 11 detects the entry into the crankshaft rotational angle area corresponding to the identified cylinder group m (m is 1, 2 or 3) in accordance with the pulse output received from the crank angle sensor 20, it restarts a timer (not shown) for period measurement. The identified cylinder group m includes the cylinder identified in the step S1.

When the processor 11 receives the next pulse output from the crank angle sensor 20, it recognizes the departure from the crankshaft rotational angle area corresponding to the identified cylinder group m, stops the time counting of the period measurement timer, and reads the time counting result (step S2). This time counting result represents a time interval Tm(n) from the moment of the entry into the crankshaft rotational angle area corresponding to the identified cylinder group m to the moment of the departure from the area, i.e., the period Tm(n) which is determined by two prescribed crank angles corresponding to the identified cylinder group. The subscript n in Tm(n) indicates that the period corresponds to the nth (the present) ignition in the identified cylinder. Further, the period Tm(n) becomes a period between 120-degree crank angles of an identified cylinder group in the 6-cylinder engine, and more generally, a period between (720/N)-degree crank angles in an N-cylinder engine.

The above-mentioned pulse output, which indicates the departure from the crankshaft rotational angle area corresponding to the present identified cylinder, also indicates the entry into the crankshaft rotational angle area corresponding to the next identified cylinder. Accordingly, in response to the pulse output, the cylinder identifying step S1 is carried out on the next cylinder to be identified, and the timer for period measurement is restarted to start the period measurement for the next identified cylinder.

In relation to the present identified cylinder, the processor 11 calculates a correction factor KLm(n) related to the identified cylinder group m in accordance with a formula, KLm(n)=a·KLm(n−1)+(1 −a)·KLm, to perform learning to eliminate a period measurement error due to the variations in the vane angle intervals caused during the manufacture and installation of the vanes (step S3). Here, a symbol a is a filter constant stored beforehand in, e.g., the read-only memory 12, the filter constant taking a value which is 0 or more and 1 or less. The symbol KLm(n−1) represents the correction factor related to the identified cylinder group m which has been calculated in the previous detection cycle and stored in the random-access memory 13, and KLm indicates a value calculated in accordance with a formula, KLm= Tm(n)÷(T(n)/3). Here, the symbol Tm(n) represents, as mentioned above, the detected period between the 120-degree crank angles of the identified cylinder group m. Further, the symbol T(n) denotes a sum of the periods between the 120-degree crank angles of the first through third cylinder groups which have been measured one after another in the previous two detection cycles and the present detection cycle, i.e., a period between the 360-degree crank angles (T(n)=T1(n)+T2(n)+T3(n)). If the engine speed is constant, then a value T(n)/3, which is obtained by dividing the period between the 360-degree crank angles by a value 3, is equivalent to the accurate period between the 120-degree crank angles when the vane angle intervals are free from errors. Hence, the calculated value KLm indicates a ratio of the period between the 120-degree crank angles of the identified cylinder group m to the accurate period between the 120-degree crank angles.

Further, based on the period $T_n$ (=Tm(n)) between 120-degree crank angles measured at step S2 in the present detection cycle, the processor 11 calculates an average angular velocity $\omega_n$ (=120 degrees/$T_n$) of the crankshaft in the period, and reads out a period $T_{n-1}$ and an average angular velocity $\omega_{n-1}$ measured, calculated, and stored in the memory 13 in the previous detection cycle. The processor 11 then calculates an average angular acceleration $D\omega_n$ of the crankshaft in the period between the 120-degree crank angles in the present detection cycle in accordance with a formula, $D\omega_n=KLm(n)\cdot(\omega_n-\omega_{n-1})\div\{(\frac{1}{2})\cdot(T_n+T_{n-1})\}$, using measured values $T_n$ and $T_{n-1}$, calculated values $\omega_n$ and $\omega_{n-1}$, and the correction factor KLm(n) calculated in the step S3 (step S4). Here, the symbol D is a differential operator symbol and denotes d/dt. In this manner, the crankshaft angular acceleration is determined in accordance with a measured period which is corrected using the correction factor KLm(n).

Next, the processor 11 determines whether the value of a flag FMF is "0" which means that an occurrence of misfire has not been detected in the last detection cycle, or in the before-last detection cycle and the last detection cycle (step S5). If the judgment result is affirmative, then the processor executes a first subroutine (step S6).

Figure 5:
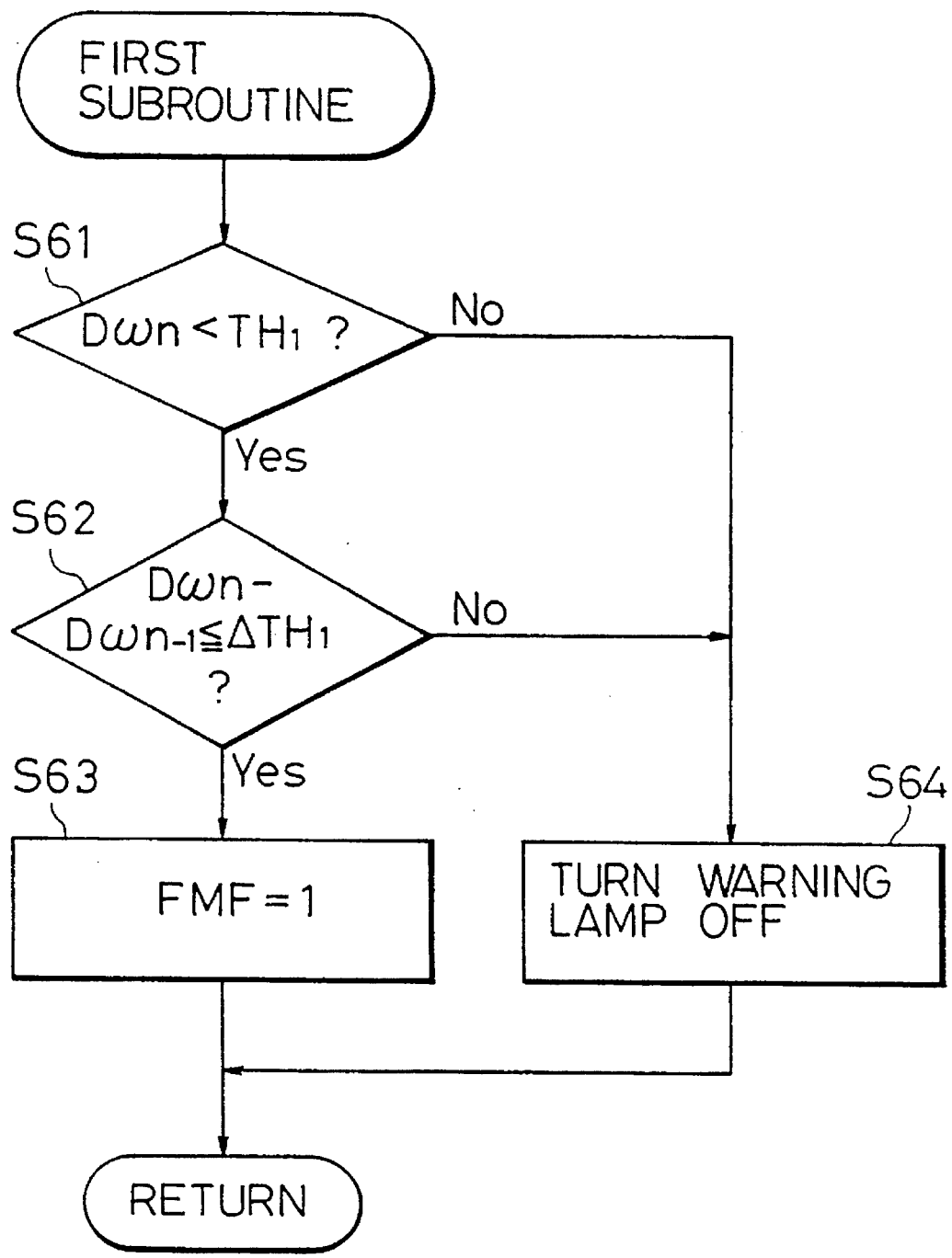
FIG. 5 is a flowchart showing the details of the first subroutine shown in FIG. 4.

As shown in FIG. 5, in the first subroutine, the processor 11 first determines whether the present average angular acceleration $D\omega_n$ calculated in the step S4 of FIG. 4 is lower than a judgment value TH1 (<0) (step S61). If the judgment result is affirmative, then the processor further determines whether the present average angular acceleration $D\omega_n$ has decreased by a specified variation ΔTH1 (>0) or more in comparison with the previous average angular acceleration $D\omega_{n-1}$ (step S62). If both judgment results of the steps S61 and S62 are affirmative, and hence the fulfillment of the misfire condition discrimination condition such that the present value $D\omega_n$ is lower than the judgment value TH1 and has decreased by the specified variation ΔTH1 or more in comparison with the previous value $D\omega_{n-1}$ is determined, then the processor 11 sets the flag FMF to a value "1" indicating that there is a high possibility of occurrence of misfire in the cylinder (a first cylinder checked for misfire) identified in the step S1 (step S63), terminates the execution of the first subroutine in the present detection cycle. On receiving the next pulse output from the crank angle sensor 20, the processor restarts the misfire detection processing of FIG. 4.

On the other hand, if the judgment result of the step S61 or S62 is negative, and hence it is determined that the aforesaid misfire condition discrimination condition is not fulfilled, then the processor 11 sends out, for example, an L-level driving signal to a lamp driving circuit 61 to cause a warning lamp 60 to be turned off, thereby notifying that no misfire has taken place in the cylinder checked for misfire (step S64), and terminates the execution of the first subroutine in the present cycle.

If the processor 11 determines in the step S5 that the value of the flag FMF is not "0," then it further determines whether the value of the flag FMF is "1" (step S7). If the judgment result is affirmative, then the processor implements a second subroutine (step S8).

Figure 6:
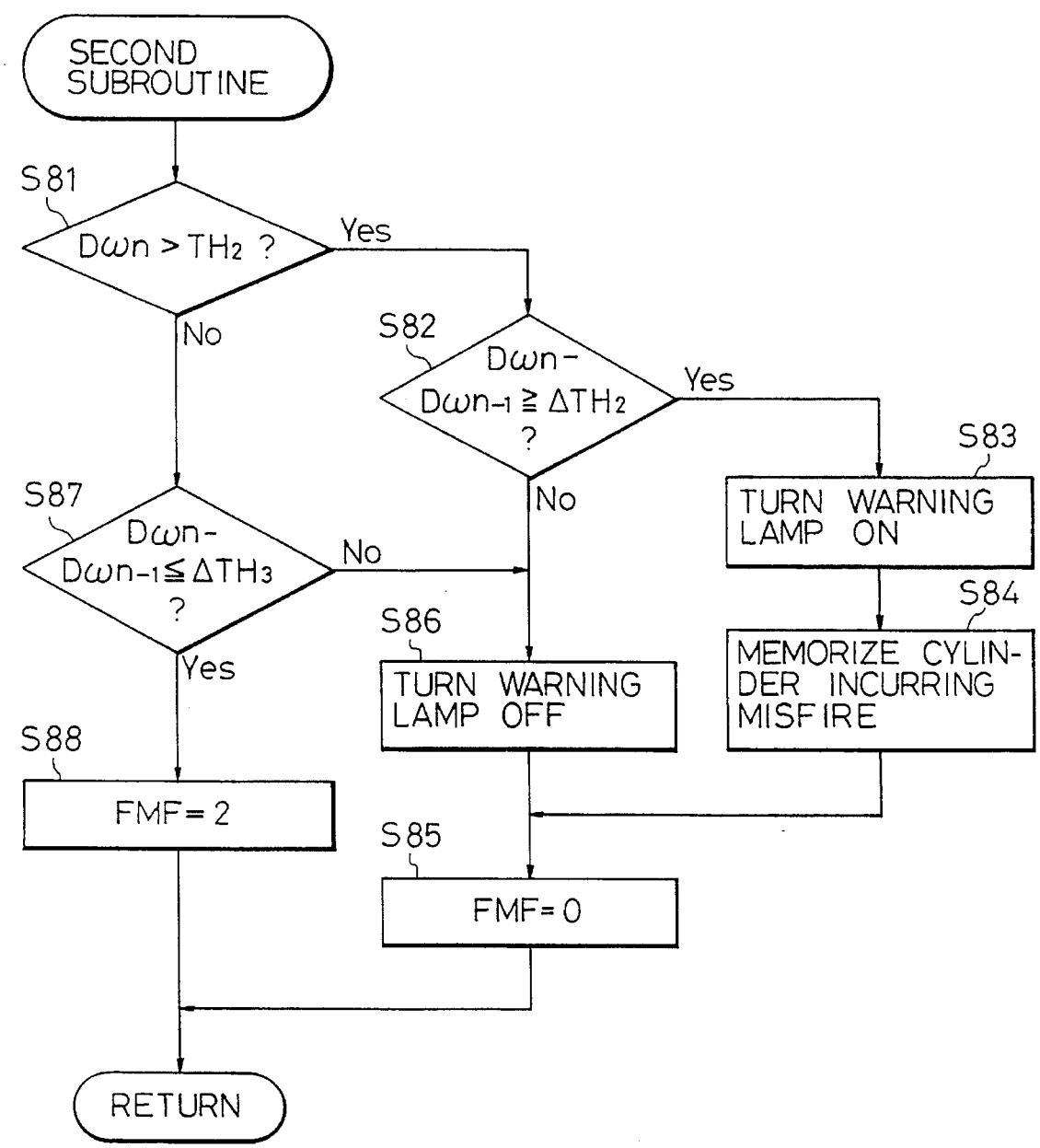
FIG. 6 is a flowchart showing the details of the second subroutine shown in FIG. 4.

As shown in FIG. 6, in the second subroutine, the processor 11 first determines whether the average angular acceleration $D\omega_n$ in the present detection cycle (a detection cycle following the detection cycle wherein the value of the flag FMF was changed from "0" to "1") exceeds a judgment value TH2 (≧TH1) (step S81). If the judgment result is affirmative, then the processor further determines whether the average present angular acceleration $D\omega_n$ has increased by a specified variation ΔTH2 (ΔTH2=ΔTH1 or ΔTH2 ≠ΔTH1) or more in comparison with the previous average angular acceleration $D\omega_{n-1}$ (step S82). If the judgment results of both steps S81 and S82 are affirmative and hence the fulfillment of the discrimination condition such that the present value $D\omega_n$ exceeds the judgment value TH2 and has increased by the specified variation ΔTH2 or more in comparison with the previous value $D\omega_{n-1}$ is determined on the second cylinder checked for misfire, and therefore, it is determined that the normal combustion state has been restored in the second cylinder checked for misfire, then the processor 11 sends out a H-level driving signal to the lamp driving circuit 61 to turn the warning lamp 60 on (step S83), and stores the information indicating that misfire has taken place only in the first cylinder checked for misfire corresponding to the previous value $D\omega_{n-1}$, in a specified area of the random-access memory 13 or the like, to memorize the cylinder which has incurred the misfire (step S84). The processor 11 further resets the value of the flag FMF to "0" (step S85), terminates the execution of the second subroutine in the present cycle, and stands by for the re-execution of the main routine of FIG. 4.

On the other hand, if the processor 11 determines in the step S82 that the present value $D\omega_n$ has not increased by the specified variation ΔTH2 or more in comparison with the previous value $D\omega_{n-1}$, then it determines that the tentative judgment, made in the first subroutine in the previous detection cycle, such that the misfire condition has occurred in the first cylinder checked for misfire, merely reflects a drop in the angular acceleration caused by some factor other than misfire (e.g., vibrational changes in the angular acceleration after the occurrence of misfire), and therefore, the tentative judgment result should be canceled. Thus, the processor 11 sends out the L-level driving signal to the lamp driving circuit 61 to turn the warning lamp 60 off, resets the value of the flag FMF to "0" (steps S86 and S85), and terminates the second subroutine.

Figure 8:
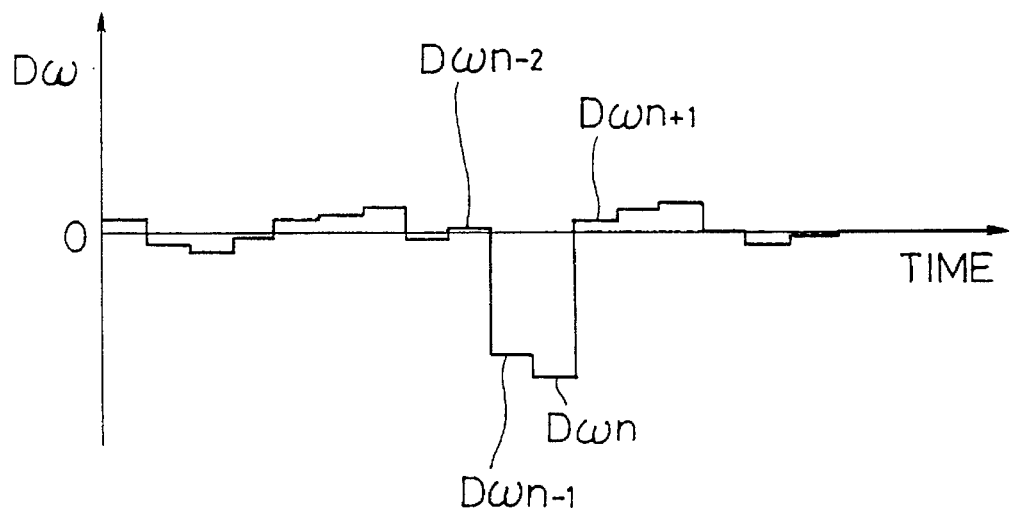
FIG. 8 is a graph illustrating a condition wherein an average angular acceleration Dω associated with a second cylinder checked for misfire has decreased below that associated with a first cylinder checked for misfire.

Furthermore, if the processor 11 determines that the present value $D\omega_n$ does not exceed the judgment value TH2 in the step S81, then it further determines whether the present value $D\omega_n$ related to the second cylinder checked for misfire has decreased by the specified variation ΔTH3 (≦0) or more in comparison with the previous value $D\omega_{n-1}$ related to the first cylinder checked for misfire (step S87). If the judgment result is affirmative and hence a magnitude relationship as shown in FIG. 8 applies between the values $D\omega_n$ and $D\omega_{n-1}$, then the processor sets the flag FMF to a value "2" indicating a high probability of misfire having occurred in the two cylinders checked for misfire which cylinders are respectively related to the values $D\omega_n$ and $D\omega_{n-1}$ (step S88), and terminates the execution of the second subroutine in the present cycle.

Figure 9:
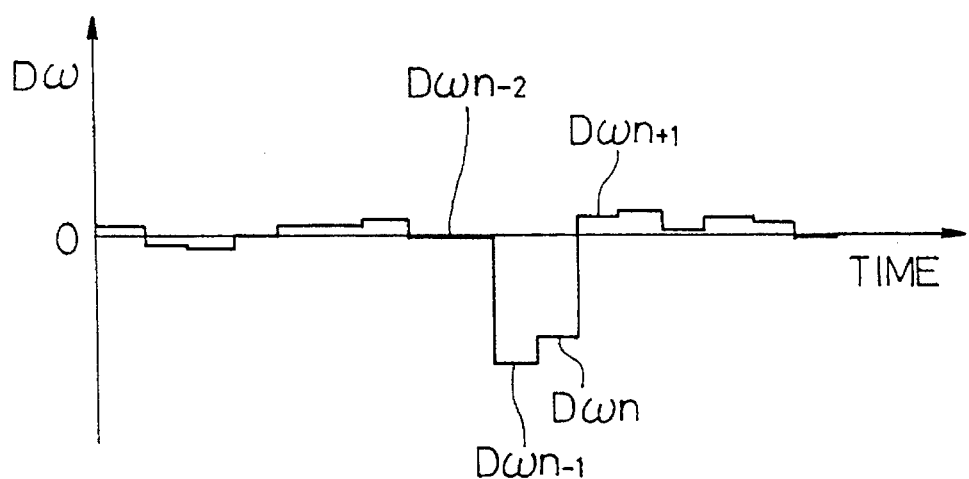
FIG. 9 is a graph illustrating a condition wherein an average angular acceleration Dω associated with the second cylinder checked for misfire has increased over that associated with the first cylinder checked for misfire.

On the other hand, if the processor 11 determines in the step S87 that the present value $D\omega_n$ has not decreased by the specified variation ΔTH3 or more in comparison with the previous value $D\omega_{n-1}$, then it determines that a mere magnitude relationship as shown in FIG. 9 applies between the values $D\omega_n$ and $D\omega_{n-1}$, and therefore, a mere drop in the average angular acceleration took place due to some reason such as a vibrational change in the angular acceleration following the occurrence of misfire. In this case, the processor 11 determines that no actual misfire has occurred in none of the two cylinders checked for misfire, sends out the L-level driving signal to the lamp driving circuit 61 to turn the warning lamp off (step S86), resets the value of the flag FMF to "0" (step S85), and terminates the second subroutine.

Furthermore, if the processor 11 determines in the aforesaid step S7 that the value of the flag FMF is not "1," then it carries out a third subroutine (step S9).

Figure 7:
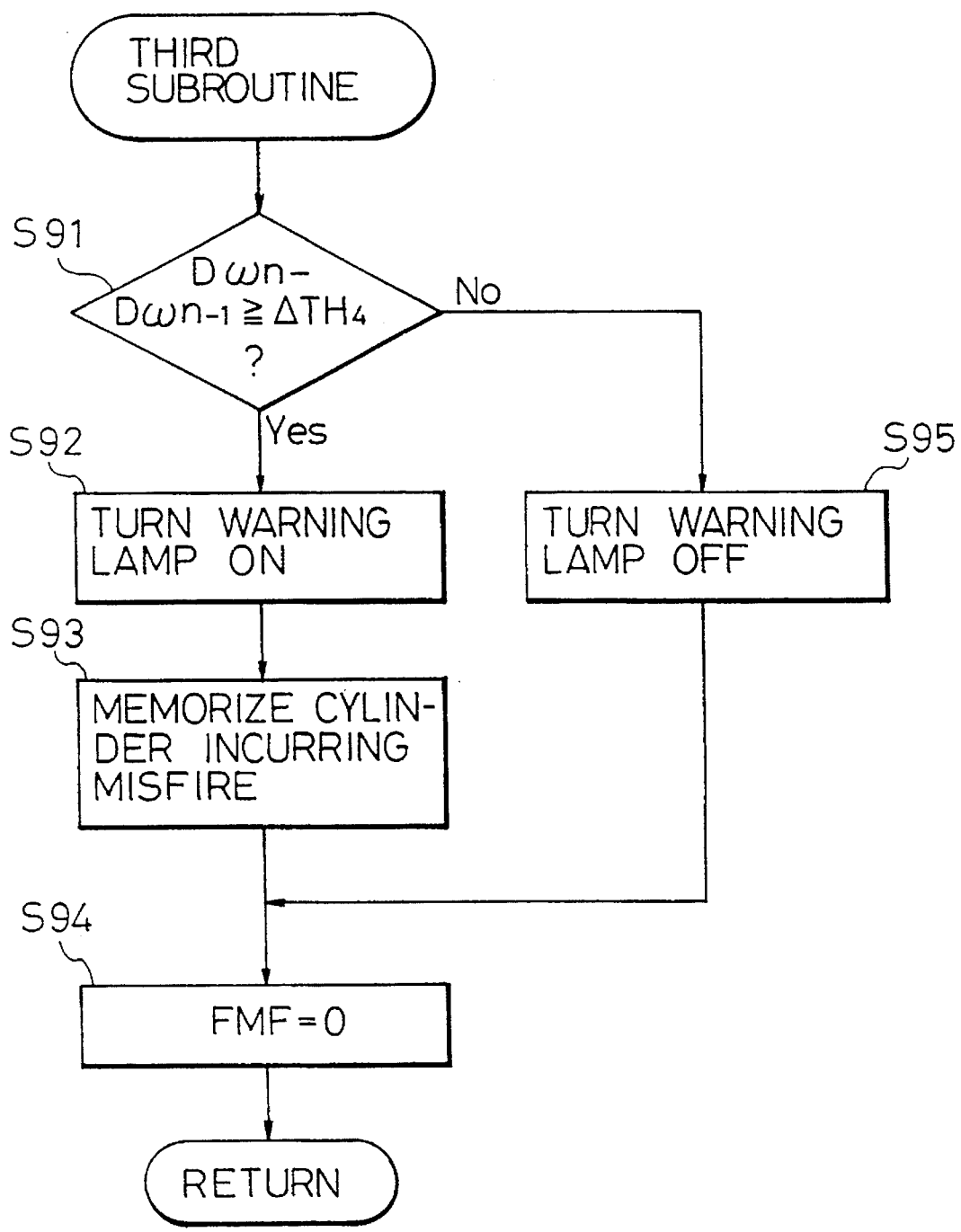
FIG. 7 is a flowchart showing the details of the third subroutine shown in FIG. 4.

As shown in FIG. 7, in the third subroutine, the processor 11 determines whether the average angular acceleration $D\omega_n$, in the present detection cycle (a detection cycle following the detection cycle wherein the value of the flag FMF was set to "2") has increased by a specified variation ΔTH4 or more in comparison with the previous average angular acceleration $D\omega_{n-1}$ (step S91). If the judgment result is affirmative and hence the recovery to the normal combustion state has been ascertained, then the processor 11 judges that misfire has occurred in the first and second cylinders checked for misfire, and sends out the H-level driving signal to the lamp driving circuit 61 to turn the warning lamp 60 on. Then, the processor stores the information, which indicates that misfire has taken place in the two cylinders respectively corresponding to the before-last value $D\omega_{n-2}$ and the last value $D\omega_{n-1}$, in a specified area of the random-access memory 13 or the like, to memorize the cylinders which have incurred the misfire (steps S92 and S93). The processor 11 further resets the value of the flag FMF to "0" (step S94), and terminates the execution of the third subroutine in the present cycle.

On the other hand, if it is determined in the step S91 that the present value $D\omega_n$ has not increased by the specified variation ΔTH4 or more in comparison with the previous value $D\omega_{n-1}$, the processor 11 determines that the restoration to the normal combustion state cannot be ascertained, and therefore, the tentative judgment, made in the second subroutine in the previous detection cycle, such that misfire has occurred in the first and second cylinders checked for misfire should be canceled. In this case, the processor sends out the L-level driving signal to the lamp driving circuit 61 to turn the warning lamp 60 off (step S95), resets the value of the flag FMF to "0" (step S94), and terminates the third subroutine.

The following describes a misfire detection method according to a second embodiment of the present invention.

The method of the present embodiment is characterized in that, when the later-mentioned discrimination condition related to the rotational speed changing rate of the crankshaft does not apply, the crankshaft rotational speed changing rate is subjected to filtering in order to eliminate the influences exerted by the vibration in the crankshaft rotational speed changing rate caused by the occurrence of misfire, thereby improving the misfire detection accuracy.

The method of the present embodiment can be implemented by the misfire detecting apparatus shown in FIGS. 2 and 3 just as in the case of the first embodiment; therefore, the explanation of the apparatus will be omitted.

The misfire detection processing in the method of the second embodiment will now be described with reference to FIG. 10.

Figure 10:
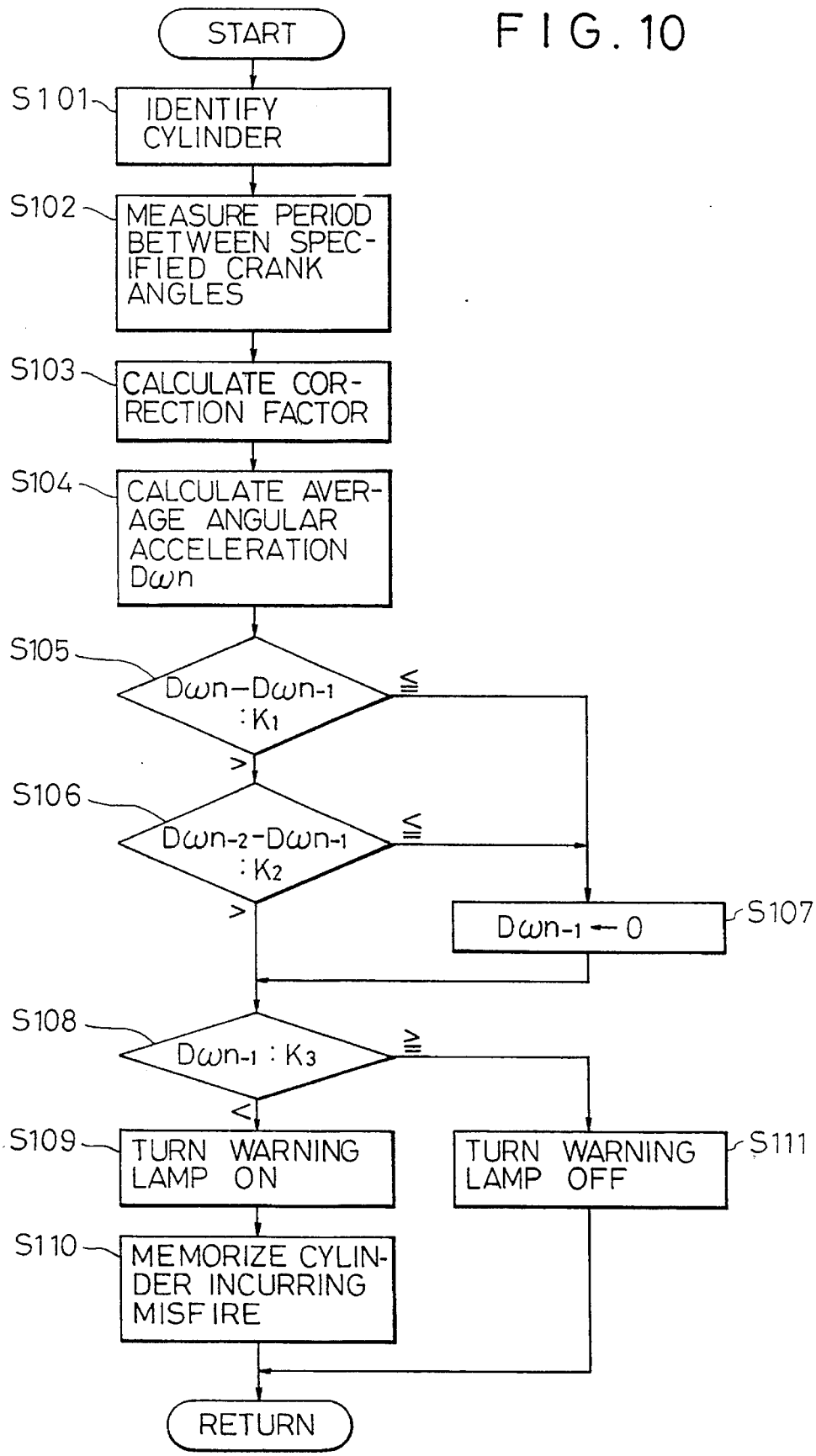
FIG. 10 is a flowchart showing misfire detection processing in a misfire detection method according to a second embodiment of the present invention.

In each cycle of the misfire detection processing shown in FIG. 10, the processor 11 sequentially carries out steps S101 through S104 respectively corresponding to the steps S1 through S4 of FIG. 4. In brief, the processor 11 identifies a cylinder corresponding to a crank angle sensor pulse output received this time (step S101). Thereafter, on receiving the next pulse output from the crank angle sensor 20, the processor measures the period Tm(n) between the 120-degree crank angles associated with the identified cylinder group m to which the cylinder identified in the step S101 belongs (step S102). The processor 11 then calculates the correction factor KLm(n) related to the identified cylinder group m in accordance with a formula, $KLm(n)=a\cdot KLm(n-1)+(1-a)\cdot KLm$ (step S103), and further calculates the average angular acceleration $D\omega_n$ of the crankshaft in the period between the 120-degree crank angles in the present detection cycle in accordance with a formula, $D\omega_n = KLm(n)\cdot(\omega_n - \omega_{n-1}) \div \{(½)\cdot(T_n + T_{n-1})\}$ (step S104).

The processor 11 then determines in sequence whether the two discrimination conditions described below are fulfilled (steps S105 and S106).

(1) The average angular acceleration $D\omega_n$ of the crankshaft in the present calculating cycle is greater than a sum of the angular acceleration $D\omega_{n-1}$ of the previous cycle and the first threshold value k1. To be more general, the crankshaft rotational speed changing rate $D\omega_n$ in the calculating cycle immediately after a calculating cycle corresponding to a cylinder checked for misfire is greater than a sum of the changing rate $D\omega_{n-1}$ in the corresponding calculating cycle and the first threshold value k1 (the difference between the changing rates $D\omega_n$ and $D\omega_{n-1}$ is greater than the first threshold value k1).

(2) The angular acceleration $D\omega_{n-2}$ in the before-last calculating cycle is greater than a sum of the last angular acceleration $D\omega_{n-1}$ and the second threshold value k2. To be more general, the crankshaft rotational speed changing rate $D\omega_{n-2}$ in the calculating cycle immediately before the corresponding calculating cycle is greater than a sum of the changing rate $D\omega_{n-1}$ of the corresponding calculating cycle and the second threshold value k2 (the difference between the changing rate $D\omega_{n-2}$ and the changing rate $D\omega_{n-1}$ is greater than the second threshold value k2).

Figure 11:
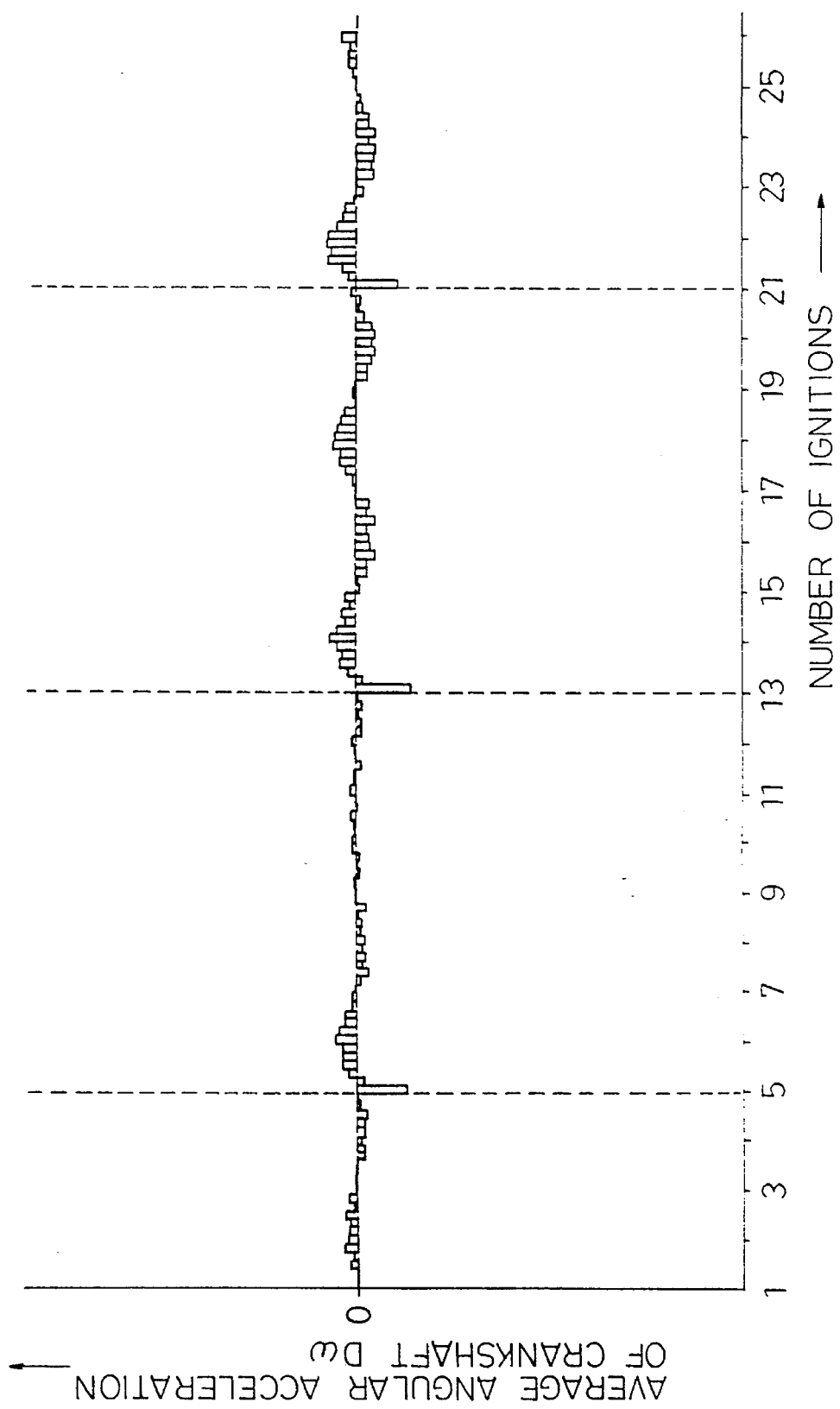
FIG. 11 is a graph illustrating vibrational increases or decreases in the average angular acceleration of the crankshaft resulting from the occurrence of a misfire condition.
Figure 12:
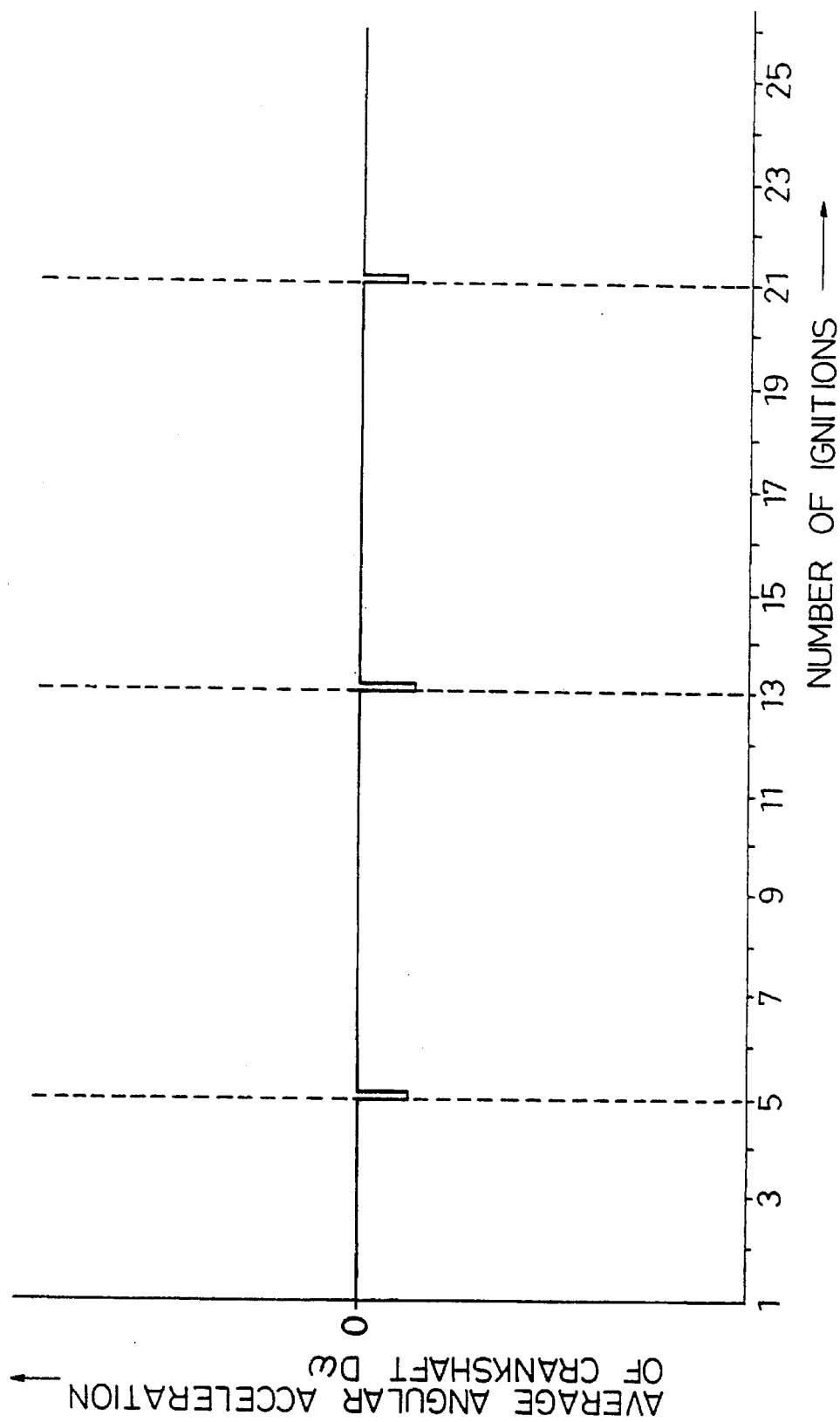
FIG. 12 is a graph showing changes in the average angular acceleration of the crankshaft in the case where the average angular acceleration of the crankshaft has been filtered in the misfire detection processing of FIG. 10 to eliminate the vibrations shown in FIG. 11.

If it is determined in the step S105 that a value $D\omega_n - D\omega_{n-1}$ obtained by deducting the previous angular acceleration $D\omega_{n-1}$ from the present angular acceleration $D\omega_n$ is equal to or less than the first threshold value k1 and hence the above-mentioned first discrimination condition is not fulfilled, or if it determined in the step S106 that a value $D\omega_{n-2} - D\omega_{n-1}$ obtained by deducting the last angular acceleration $D\omega_{n-1}$ from the before-last angular acceleration $D\omega_{n-2}$ is equal to or less than the second threshold value k2 and hence the above-mentioned second discrimination condition is not fulfilled, then the processor 11, determining that the vibration (see, FIG. 11) of the crankshaft after the occurrence of misfire has influenced the angular acceleration in the last cycle, substitutes a value "0" for the calculated angular acceleration $D\omega_{n-1}$ to subject the calculated angular acceleration $D\omega_{n-1}$ in the last cycle to filtering (step S107). This eliminates the influences exerted by the vibration of the angular acceleration (see, FIG. 12), thereby preventing erroneous detection of the occurrence of misfire. In FIG. 12, the drops in the angular acceleration at the 5th, 13th, and 21st ignitions were caused by the occurrence of misfire.

On the other hand, if it is determined that both the first and second discrimination conditions are fulfilled and therefore the average angular acceleration $D\omega_{n-1}$ of the crankshaft suddenly changed in the previous cycle, the processor, judging that the change in the angular acceleration has not been caused by the influence exerted by the angular acceleration vibration following the occurrence of the misfire condition, does not subject the calculated angular acceleration $D\omega_{n-1}$ in the previous calculating cycle to filtering.

Next, the processor 11 compares the last average angular acceleration $D\omega_{n-1}$, which takes the value calculated in the step S104 when both the first and second discrimination conditions are fulfilled, and which takes the value "0" set in the step S107 when the first or second discrimination condition is not fulfilled, and a discriminating reference value k3 for misfire judgment stored in the memory 12 beforehand, to thereby determine a magnitude relation therebetween (step S108). The discriminating reference value k3 is set to a negative value. If the processor 11 determines that the angular acceleration $D\omega_{n-1}$ is smaller than the discriminating reference value k3, then it sends out, for example, the H-level driving signal to the lamp driving circuit 61 to turn the warning lamp 60 on, thereby giving an alarm that misfire has taken place in the cylinder checked for misfire, which cylinder preceding the identified cylinder (step S109). Further, the processor causes the information, indicating that the cylinder preceding the cylinder identified in the step S101 has incurred misfire, to be stored in the memory 13 (step S110). On the other hand, if it is determined in the step S108 that the average angular acceleration $D\omega_{n-1}$ of the crankshaft exceeds the discriminating reference value k3, then the processor issues, for example, the L-level driving signal to turn the warning lamp 60 off, thereby indicating that no misfire has taken place in the cylinder checked for misfire (step S111).

When the storage of the information indicative of the cylinder incurring the misfire in the step S110 or the turning-off of the warning lamp in the step S111 is completed, the processor 11 stands by for receipt of the next pulse output from the crank angle sensor 20. On receiving the pulse output, the processor restarts the processing of FIG. 10.

The present invention is not limited to the first and second embodiments described above, but may be modified in various manners.

For instance, in the first and second embodiments, the cases wherein the present invention is applied to a 6-cylinder engine were described, however, the present invention can be applied to various engines including a 4-cylinder engine.

Further, in the first embodiment, the description was given to the 2-cylinder judgment method wherein two cylinders to be ignited one after another are subjected to the misfire judgment in one misfire judgment process. This invention, however, can also be applied to a 1-cylinder judgment method wherein only one cylinder is subjected to the misfire judgment at a time, in this case, for example, the steps S7 and S9 of the main routine shown in FIG. 4 and the steps S87 and S88 of FIG. 6 are omitted, so that the step S8 is immediately implemented if the judgment result in the step S5 is negative, and the step S86 is immediately implemented if the judgment result of the step S81 is negative.

In the first embodiment related to the 2-cylinder judgment method, in order to improve the accuracy of tentative judgment, the occurrence of misfire in the first cylinder checked for misfire is tentatively judged when the calculated parameter value $D\omega_n$ associated with the first cylinder checked for misfire is lower than the judgment value TH1, and also has decreased by the specified variation ΔTH1 or more in comparison with the parameter value $D\omega_{n-1}$ associated with the preceding cylinder (steps S61 and S62 of FIG. 6). However, the tentative judgment of the occurrence of misfire may be made only by detecting that the value $D\omega_n$ has lowered below the judgment value TH1, or only by detecting that the value $D\omega_n$ have decreased by the specified variation ΔTH1 or more in comparison with the value $D\omega_{n-1}$. The same modification can be applied to the 1-cylinder judgment method.

Further, in the first embodiment, the recovery to the normal combustion state (the occurrence of misfire in the first and second cylinders checked for misfire) is determined when the parameter value $D\omega_n$ for the succeeding cylinder has increased the specified variation ΔTH4 or more in comparison with the parameter $D\omega_{n-1}$ for the second cylinder under the judgment of misfire (step S91 of FIG. 7). However, the recovery may alternatively be determined by detecting that the parameter value associated with the succeeding cylinder has exceeded a preset judgment value. In this case, the value $D\omega_n$ is compared in magnitude, in the step S91, with the judgment value for determining the recovery, and either the step S92 or S95 of FIG. 7, whichever is appropriate, may be implemented in accordance with the comparison result. Alternatively, to ensure more reliable determination of the recovery to the normal combustion state and also more tellable judgment of misfire, the judgment of recovery may be made by detecting that the value $D\omega_n$ exceeds the judgment value for recovery judgment and also has increased by the variation ΔTH4 or more in comparison with the value $D\omega_{n-1}$.

In relation to this modification, in the first embodiment, the recovery to the normal combustion state is determined when the parameter value $D\omega_n$ for the second cylinder checked for misfire exceeds the judgment value TH2 and also has increased by the specified variation ΔTH2 or more in comparison with the parameter value $D\omega_{n-1}$ for the first cylinder checked for misfire, so as to perform the recovery judgment in a more accurate manner, thereby definitely determining the occurrence of misfire only in the first cylinder checked for misfire (steps S81 and S82 of FIG. 6). However, to simplify the judgment of the recovery to the normal combustion state, only the step S81 or S82 may be implemented. To be more specific, when only the step S81 is carried out, omitting the step S82, the judgment value TH2 is set to a value which is greater than TH1 (TH2>TH1), and if the determination result in the step S81 is affirmative, then the step S83 is implemented. When implementing only the step S82, omitting the step S81, the control procedure may be so designed that the step S87 is first carried out in the second subroutine of FIG. 6, and if the determination result is affirmative, then the step S88 is implemented, and if the determination result is negative, then the step S82 is carried out, and further if the determination result in the step S82 is affirmative, then the step S83 is implemented, and if the determination result is negative, the step S86 is implemented.

Additionally, in the first embodiment and its modification, when either one or both of the discrimination conditions (the first and second discrimination conditions) related to a cylinder checked for misfire and its succeeding cylinder are not fulfilled, the filtering process of the second embodiment may be carried out.

Further, the various judgment values and specified variations in the first and second embodiments are examples, and they may be set in various manners. For instance, these values and variations may be variably set in accordance with the engine running area and the load condition.

Furthermore, in the misfire detection processing (FIGS. 4 and 10) of the first and second embodiments, in order to eliminate period measurement errors caused by variations in the vane angle intervals, the correction factor is computed and used to calculate the crankshaft angular acceleration $D\omega$, but the arithmetic operation of the correction factor and the calculation of the angular acceleration based on the correction factor are not essential.

We claim:

1. A misfire detection method based on a change in crankshaft rotation in which a crankshaft angular acceleration information quantity associated with each cylinder of an internal combustion engine is repeatedly calculated, and occurrence/absence of misfire in a cylinder-checked-for-misfire is detected in accordance with the angular acceleration information quantities, comprising:

a first step of determining whether at least one of (a) and (b) is fulfilled;

(a) the angular acceleration information quantity detected in association with the cylinder-checked-for-misfire is lower than a first judgment value;

(b) the angular acceleration information quantity detected in association with the-cylinder-checked-for-misfire has decreased by a first specified variation or more in comparison with the angular acceleration information quantity detected in association with a preceding cylinder which ignites immediately before ignition in the cylinder-checked-for-misfire;

a second step of determining whether at least one of (c) and (d) is fulfilled;

(c) the angular acceleration information quantity detected in association with a succeeding cylinder which ignites immediately after ignition in the cylinder-checked-for-misfire exceeds a second judgment value;

(d) the angular acceleration information quantity detected in association with said succeeding cylinder has increased by a second specified variation or more in comparison with the angular acceleration information quantity detected in association with the cylinder-checked-for-misfire; and a third step of determining that a misfire has occurred in the cylinder-checked-for-misfire when said first step determines that at least one of (a) and (b) is fulfilled and said second step determines that at least one of (c) and (d) is fulfilled.

2. The misfire detection method according to claim 1, wherein said first step determines whether (c) and (b) is fulfilled;

said second step determines whether (c) and (d) is fulfilled; and said third step determines that a misfire has occurred in the cylinder-checked-for-misfire only when said first step determines that both of (a) and (b) are fulfilled and said second step determines that both of (c) and (d) are fulfilled.

3. The misfire detection method according to claim 1, further comprising:

a fourth step of filtering the angular acceleration information quantity detected in association with the cylinder-checked-for-misfire when said first step determines that neither (a) and (b) is fulfilled, or when said second step determines that neither (c) and (d) is fulfilled.

4. The misfire detection method according to claim 3, wherein said filtering is conducted by substituting a value of zero for the angular acceleration information quantity detected in association with the cylinder-checked-for-misfire.

5. A misfire detection method based on a change in crankshaft rotation in which a crankshaft angular acceleration information quantity associated with each cylinder of an internal combustion engine is repeatedly calculated, and occurrence/absence of misfire in a cylinder-checked-for-misfire is detected in accordance with the angular acceleration information quantities, comprising:

a first step of determining whether at least one of (a) and (b) is fulfilled;

(a) the angular acceleration information quantity detected in association with a first-cylinder-checked-for-misfire, which ignites first out of two cylinders which are checked for misfire and ignite one after another, is lower than a first judgment value;

(b) the angular acceleration information quantity detected in association with said first-cylinder-checked-for-misfire has decreased by a first specified variation or more in comparison with the angular acceleration information quantity detected in association with a preceding cylinder which ignites immediately before ignition in said first-cylinder-checked-for-misfire;

a second step of determining whether (c) is fulfilled;

(c) the angular acceleration information quantity detected in association with a second-cylinder-checked-for-misfire, which ignites later out of said two cylinders checked for misfire, has decreased by a second specified variation or more in comparison with the angular acceleration information quantity detected in association with said first-cylinder-checked-for-misfire;

a third step of determining whether at least one of (d) and (e) is fulfilled;

(d) the angular acceleration information quantity, detected in association with a succeeding cylinder, which ignites immediately after ignition in said second-cylinder-checked-for-misfire, exceeds a second judgment value;

(e) the angular acceleration information quantity, detected in association with a succeeding cylinder has increased by a third specified variation or more in comparison with the angular acceleration information quantity detected in association with said second-cylinder-checked-for-misfire; and a fourth step of determining that a misfire has occurred in said first-and second-cylinders-checked-for-misfire when said first step determines that at least one of (a) and (b) is fulfilled, said second step determines that (c) is fulfilled, and said third step determines that at least one of (d) and (e) is fulfilled.

6. The misfire detection method according to claim 5, wherein said first step determines whether (a) and (b) are fulfilled; and said fourth step determines that a misfire has occurred in said first and second-cylinders-checked-for-misfire when said first step determines that both of (a) and (b) are fulfilled, said second step determines that (c) is fulfilled, and said third step determines that at least one of (d) and (e) is fulfilled.

7. A misfire detection method based on a change in crankshaft rotation in which a rotational speed changing rate of a crankshaft for each cylinder of an internal combustion engine is periodically calculated, and an occurrence of misfire in a cylinder-checked-for-misfire is detected when the rotational speed changing rate of the crankshaft in a calculating cycle corresponding to the cylinder-checked-for-misfire has dropped below a specified judgment reference value, comprising:

a first step of determining whether (a) is fulfilled;

(a) a difference between the rotational speed changing rate of the crankshaft in a calculating cycle immediately after the calculating cycle corresponding to the cylinder-checked-for-misfire and the rotational speed changing rate of the crankshaft in the calculating cycle corresponding to the cylinder-checked-for-misfire exceeds a first threshold value;

a second step of determining whether (b) is fulfilled;

(b) a difference between the rotational speed changing rate of the crankshaft in a calculating cycle immediately before the calculating cycle corresponding to the cylinder-checked-for-misfire and the rotational speed changing rate of the crankshaft in the calculating cycle corresponding to the cylinder-checked-for-misfire exceeds a second threshold value; and a third step of filtering the rotational speed changing rate of the crankshaft in the calculating cycle corresponding to the cylinder-checked-for-misfire when said first and second steps determine that only one of (a) and (b) is fulfilled, and of terminating the filtering when said first and second steps determine that both of (a) and (b) are fulfilled.

8. The misfire detection method according to claim 7, wherein said filtering in said second step is performed by substituting a value of zero for the rotational speed changing rate of the crankshaft calculated in the calculating cycle corresponding to the cylinder-checked-for-misfire.

9. The misfire detection method according to claim 7, wherein the rotational speed changing rate of the crankshaft is represented by an angular acceleration of the crankshaft.

10. The misfire detection method according to claim 7, further comprising:

a fourth step of determining whether the rotational speed changing rate of the crankshaft in the calculating cycle corresponding to the cylinder-checked-for-misfire is lower than a third threshold value; and a fifth step of determining that a misfire has occurred in the cylinder-checked-for-misfire when said first and second steps determine that both of (a) and (b) are fulfilled and said fourth step determines that the rotational speed changing rate of the crankshaft in the calculating cycle corresponding to the cylinder-checked-for-misfire is lower than the third threshold value.

* * * * *